E. G. REWELL.
MILK CAN LID HOLDER.
APPLICATION FILED AUG. 10, 1916.
1,224,212.
Patented May 1, 1917.
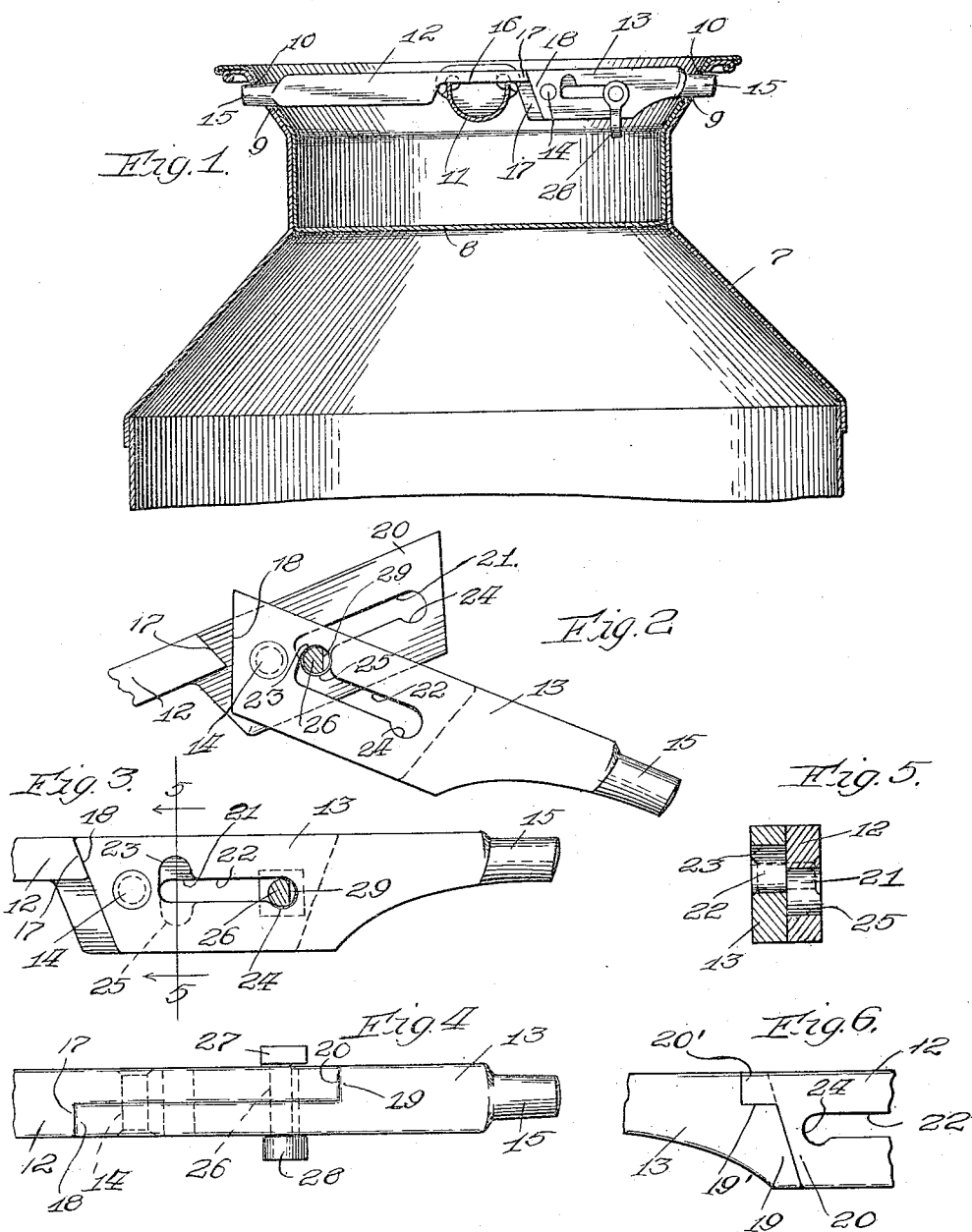
Witness:
R. L. Farrington
Inventor,
Elbridge G. Rewell.
By Brown Nissen & Sprinkle
Attys.

UNITED STATES PATENT OFFICE.

ELBRIDGE G. REWELL, OF COUNCIL BLUFFS, IOWA, ASSIGNOR OF ONE-HALF TO OSCAR F. ORNDOFF, OF HARVEYS, PENNSYLVANIA.

MILK-CAN-LID HOLDER.

1,224,212.  Specification of Letters Patent.  Patented May 1, 1917.

Application filed August 10, 1916. Serial No. 114,087.

*To all whom it may concern:*

Be it known that I, ELBRIDGE G. REWELL, a citizen of the United States, residing at Council Bluffs, in the county of Pottawattamie and State of Iowa, have invented certain new and useful Improvements in Milk-Can-Lid Holders, of which the following is a specification.

This invention relates to a device for holding or locking the lid of a milk can in connection with the can itself, and the principal object of the invention is to provide a device of this kind which is simple in construction, and effective and efficient in operation. The invention consists in the features of novelty in the construction, combination and arrangement of the several parts.

In the accompanying drawing,—

Figure 1 is a section of a milk can and lid with a device constructed in accordance with the principles of this invention applied thereto and holding the lid in place; Fig. 2 is a view showing the device in position for inserting or removing it; Fig. 3 is an enlarged detail view showing the locking member in section; Fig. 4 is a top view of the locking member; Fig. 5 is a section taken on line 5—5 of Fig. 3; and Fig. 6 is a modification showing one of the locking parts with a projecting lip.

In handling or shipping milk cans, it often happens if the can is too full of liquid, that a sudden jar or jolt will force the lid from the can, and even if it does not entirely displace the lid, it may result in the loss of some of the liquid contents of the can. This loss may amount to considerable if the contents of the can is cream, or if there are a great many cans, and the object of the present invention is to provide a simple and inexpensive device which can be quickly applied and removed from a milk can and its lid, for securely locking the lid in place, when desired. Although the invention is particularly described as applied to milk cans, it is obvious of course, that the same invention may be employed wherever it can be used.

In Fig. 1, the numeral 7 designates generally a milk can with a removable lid 8. The can and lid are provided with apertures 9 and 10 respectively, usually diametrically opposite, which register with each other when the lid is applied to the can. The lid has a cross-piece or handle 11, by means of which it is applied to or removed from the can.

The lid-locking device proper comprises two parts 12 and 13, connected by a rivet 14. Each of the parts has an extremity 15 which tapers slightly toward the end and is adapted to be inserted through the registering openings 9 and 10 at one side of the can and its lid. One of the parts 12 has a flat portion 16 which extends over the handle 11, and between the handle 11 and the rivet 14, the parts 12 and 13 are formed with an inclined shoulder 17, and a corresponding inclined extremity 18. This shoulder and extremity permit the relative rotation of the parts 12 and 13 with respect to each other in one direction, as shown by Fig. 2, but preventing rotation in the other direction. When the said shoulder and projection are in engagement, as shown in Fig. 1, the flat portion 16 of the member 12 rests on the handle 11, and the extremities 15 of the two members 12 and 13 are projected through the registering openings 9 and 10. In order to lock the two pivoted parts in the position shown by Fig. 1, and to permit their angular movement into the position shown by Fig. 2, the member 13 is formed with a shouldered portion 19, and the member 12 with a beveled extremity 20, as indicated in Fig. 4, and as more clearly shown in the rotated position in Fig. 2. With this construction, the parts 12 and 13 have parallel extensions, as clearly indicated in Figs. 4 and 5, and these parts of the members 12 and 13 are formed with slots 21 and 22 respectively. The slot 22 of the member 13 has an upward extension 23 at one end, and a rounded portion 24 at the other end, and the member 12 has a downward extension 25 at the same end as the upward extension 23 of the other slot, and a rounded portion at the other end of its slot corresponding to the rounded portion 24 of the slot 22. In these slots 21 and 22 a pin 26 is slidably movable. One end of the pin is provided with a head 27, and at the other end is a weighted arm 28. The weighted arm tends to turn the pin and hold it in the position shown by Fig. 1, and the arm and the head 27 being secured to or formed integral with the pin, hold it in place with respect to the members 12 and 13. One side 29 of the pin is flattened, and the slots 21 and 22 are of such width that the pin 26 can only be slid from one end to the other of the slots 21 and 22 when the flat side 29 of the pin is up or down in the slots. The slots having an enlarged portion 24 at one end, prevent the movement of the pin to the other ends of the slots until the pin is rotated to bring the flat side 29 at the top or bottom of the slot by means of the arm 28.

When the pin is seated in the rounded portions 24 of the slots, as shown in Figs. 1 and 3, the members 12 and 13 are locked against movement about their pivot 14, thereby holding their extremities 15 in engagement with the openings 9 and 10. By rotating the arm 28 and the pin 26 to bring the flat side 29 at the bottom or top of the slots 21 and 22, the pin 26 can be slid lengthwise of the slots, where the extensions 25 and 23, which are close to the pivot 14, will permit the rotation of the members 12 and 13 with respect to each other to take the position shown by Fig. 2, in which the locking device can be removed from engagement with the can lid, and this is also the position in which the locking device must be placed in order to apply it to the lid and the can.

Instead of making the members 12 and 13 with simple inclined shoulders and extensions, one of the members 12, as shown in Fig. 6, can be provided with a projecting ear 20' in addition to the inclined end extremity 20, which will necessitate that the shoulder 19 of the member 13 must be provided with a corresponding recess 19' to seat the end 20'. It is believed that this will provide a more positive and more defined stop for the members 12 and 13, bringing their slots more accurately in register with each other.

I claim:—

1. A lid lock of the class described comprising a pair of members pivoted to each other adjacent one end of each of the members and unattached to the lid, said members having a coöperating shoulder and extremity for limiting the pivotal movement of the members in one direction, and each of the members having a reduced outer extremity both of which are advanced and retracted by the pivotal movement of the members.

2. In a lid lock of the class described, the combination with a pair of members pivoted to each other adjacent one end of each member, both members having an extremity which is advanced and retracted by the pivotal movement of the members, and additional means movable with respect to both members for locking the members together when their extremities are in the most extended position.

3. In a lid lock of the class described, a pair of members pivoted together adjacent one extremity of each member, the other extremity of each member being movable by the pivotal movement of the two members, said members being formed with an inclined shoulder and a correspondingly inclined extremity to limit the pivotal movement in one direction, and separate means to lock the members against pivotal movement when the extremity and shoulder are in contact.

4. In a lid lock of the class described, a pair of members pivoted together having parallel portions adjacent the pivot point, means for limiting the pivotal movement of the members in one direction, and a separately operable locking device in connection with the said parallel portions for limiting the pivotal movement in the other direction.

5. In a lid lock of the class described, a pair of members pivoted together having parallel portions with slots therein, and a member movable in the slots of both members for locking the pivoted members in one position.

6. In a lid lock of the class described, a pair of members pivoted together having parallel portions with slots therein, and a member movable in both slots for limiting the movement of the pivoted members in one direction and for locking them against movement in the other direction.

7. In a lid lock of the class described, a pair of pivoted members having parallel portions with registerable slots therein, and a member slidable in the two slots permitting a limited rotation of the members when the locking member is at one end of the slots and preventing their rotation when the member is at the other end of the slots.

8. In a lid lock of the class described, a pair of pivoted members having slotted portions of which the slots may be brought to register one of the slots turning upwardly at one end and the other slot turning downwardly at the same end, and a locking member slidable in the slots permitting a limited pivotal movement of the members when the locking member registers with the said ends of the slots.

9. In a lid lock of the class described, the combination with a pair of pivoted members having parallel portions with registerable slots therein, each slot having an enlargement at the ends, and a locking member flattened on one side and slidable in the slots only when the flattened portion engages the sides of the slots.

10. In a lid lock of the class described, the combination with a pair of pivoted members having parallel portions with registerable slots therein, each slot having an enlargement at the ends, and a locking member having a weighted arm and a flattened portion parallel with the arm so that the locking device will be turned by gravity and said arm at both ends of the slots.

11. In a lid lock of the class described, a pair of pivoted members having parallel portions with registerable slots in said portions having enlargements at the ends, and a weighted locking device rotatable in the enlargements of the slots and movable in the slots only when the weighted portion of the locking device is raised parallel with the slots.

12. In a lid-locking device, a pair of members each formed with an inclined extremity and an off-set shouldered portion against which the extremity of the other member engages, a pivot connecting the members, and locking means to hold the members with their extremities engaging the said shoulder, but movable to permit the rotation of one member with respect to the other.

13. The combination with a pair of members pivotally connected with each other and having parallel slotted portions adjacent the pivot, and a locking device slidable in the slotted portions toward and from the pivot, the said slotted portions having enlargements adjacent the pivot to permit the relative rotation of the members when the locking device is at this end of the slot.

14. The combination with a pair of pivoted members having registerable slots adjacent the pivot and enlargements at both ends of the slots, and a locking device slidable only in the slots, but rotatable in the enlargements thereof at the ends of the slots.

15. In a lid-locking device, a pair of members pivoted together having parallel portions with registerable slots, the slots being formed with enlargements at the ends, a locking device slidable only in the slots and rotatable in the enlargements of the slots, and means to automatically rotate the device in the enlargements of the said slots to prevent it from accidentally entering the intermediate portions of the slots.

16. In a lid-locking device, a pair of members pivoted together having parallel portions with registerable slots, the slots being formed with enlargements at the ends, a locking device slidable only in the slots and rotatable in the enlargements of the slots, and a weighted arm connected to the locking device for rotating it by gravity to prevent the device from accidentally entering the intermediate portions of the slots from either end thereof.

17. The combination with a milk can and its lid having registering perforations in the opposite edges, an unattached lid-locking device comprising two members pivoted together permitting the ends thereof to be inserted through the perforations and having shoulders to limit the rotation of the members after their extremities are inserted through the perforations, and separate locking means engaging both of the members to prevent their accidental pivotal movement.

18. In combination, a lid with upstanding edges having opposite perforations and a transverse handle, of a free and separate locking device comprising a pair of pivoted members having extremities insertible through the lid perforations, one of the members having a flattened portion extending over the said handle, and separately operable locking means movable with respect to both members and from one position where the members are held in engagement with the perforations to another position in which the members may be rotated with respect to each other for inserting and withdrawing their ends from the said perforations.

19. The combination with a pair of pivoted members having parallel portions with registerable slots and an inclined shoulder and a corresponding engaging extremity, the extremity being formed with a projection and the shoulder being formed with a corresponding depression so that the slots of the two members may be brought accurately in register when the said shoulder and extremity abut, and separately operable locking means slidable in the slots of both members when they register.

20. The combination with a milk can and its lid having registering perforations in the opposite edges, and an unattached locking device comprising two members pivoted together adjacent one end of each member with the other ends insertible through the said perforations and separate locking means movable with respect to both members for holding them against pivotal movement.

In testimony whereof I have signed my name to this specification, on this 27th day of July, A. D. 1916.

ELBRIDGE G. REWELL.

Copies of this patent may be obtained for five cents each, by addressing the "Commissioner of Patents, Washington, D. C."